Nov. 26, 1929. C. A. DANIEL Re. 17,507

CURTAIN SHADE ROLLER

Original Filed Feb. 8, 1919 2 Sheets-Sheet 1

Inventor,
Cecil A. Daniel
By Vernon E. Hodges
his Atty.

Nov. 26, 1929. C. A. DANIEL Re. 17,507

CURTAIN SHADE ROLLER

Original Filed Feb. 8, 1919 2 Sheets-Sheet 2

Inventor,
Cecil A. Daniel
By Vernon E. Hodges
his Atty.

Reissued Nov. 26, 1929 Re. 17,507

UNITED STATES PATENT OFFICE

CECIL A. DANIEL, OF GREENSBORO, NORTH CAROLINA, ASSIGNOR TO CUNNINGHAM SPRINGLESS SHADE COMPANY, OF GREENSBORO, NORTH CAROLINA, A CORPORATION OF NORTH CAROLINA

CURTAIN-SHADE ROLLER

Original application filed February 8, 1919, Serial No. 275,778. Renewed June 15, 1921, Serial No. 477,864. Original No. 1,404,837, dated January 31, 1922. Application for reissue filed August 1, 1925. Serial No. 47,637.

My invention relates to an improvement in curtain shade rollers, and the means for raising and lowering the same.

This invention is an improvement on the construction disclosed in Letters Patent to Dawson, No. 1,181,852, dated May 2, 1916, on which Reissue Patent No. 14,375 was granted October 9, 1917, and while operating in a way on the same principle, that is of both raising and lowering the curtain by a single cord, the object of this invention is to greatly simplify that device in economy and cost of manufacture and to produce a simple device which will operate to automatically raise or lower the curtain-shade and fasten it at any predetermined height by the manipulation of a single cord.

With the foregoing objects in view, this invention consists in an automatic stop-roller or pulley constructed and adapted to cooperate with its support to receive and guide the curtain-raising and lowering cord in both the raising and lowering operation, and so automatically pinch or clamp the cord between itself and its support when the curtain reaches the desired adjustment.

In the accompanying drawings:—

Figure 1:
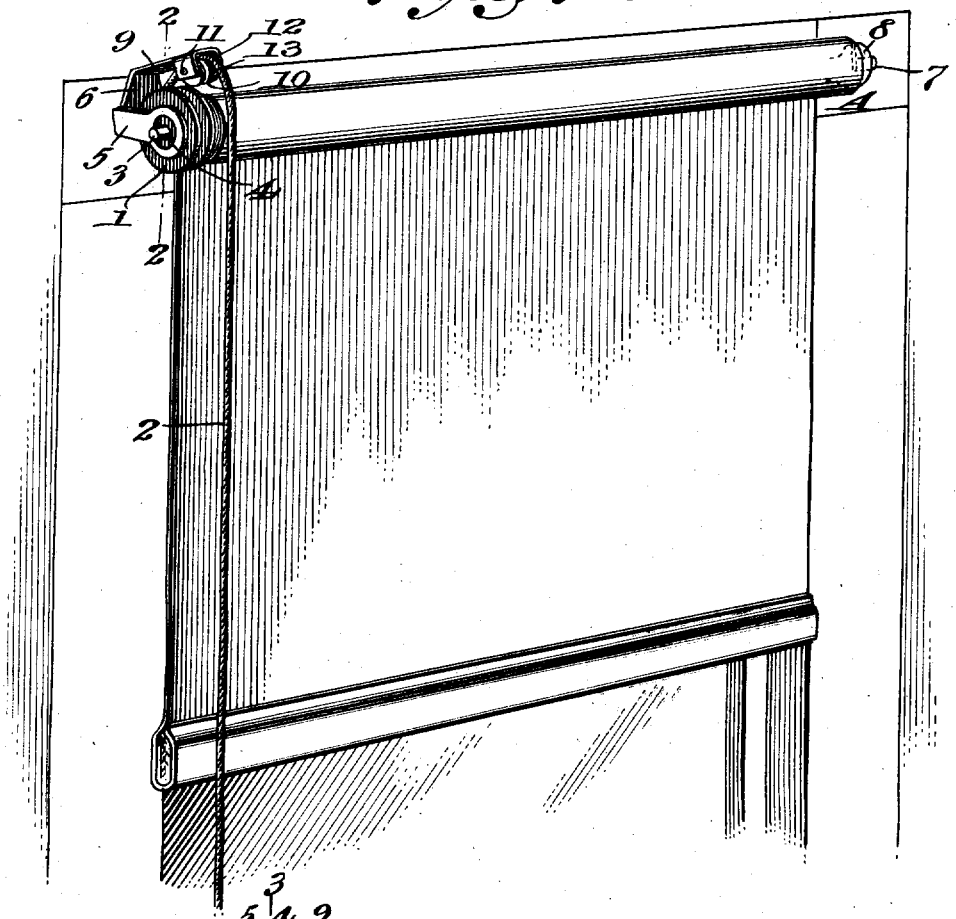
Fig. 1 is a view in perspective.
Figure 2:
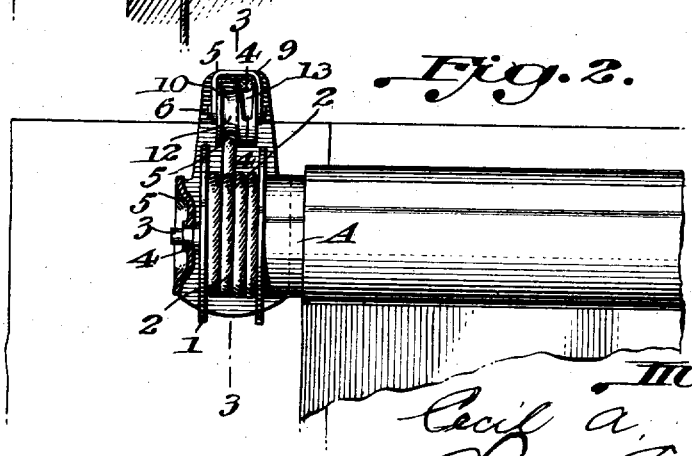
Fig. 2 is a longitudinal section through the bracket, the end of the roller, and the pulley on the line 2—2 of Fig. 1.
Figure 3:
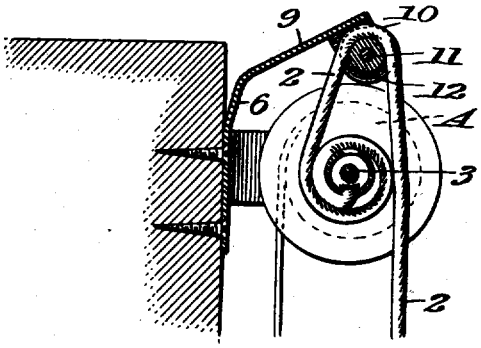
Fig. 3 is a section on the line 3—3 of Fig 2, taken at right-angles to Fig. 2.
Figure 4:
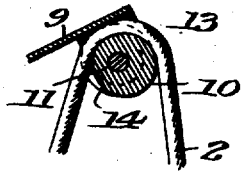
Figure 5:
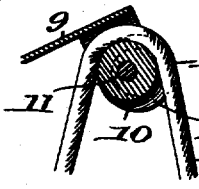
Figure 6:
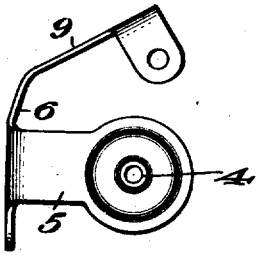
Figure 7:
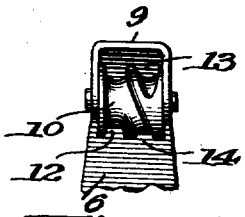

Figs. 4 and 5 are sections on the lines 4—4 and 5—5 of Fig. 2, showing the stop pulley in different positions with respect to the curtain raising and lowering cord;

Fig. 6 is an end view;

Fig. 7 is an enlarged view of the pulley in the position shown in Fig. 2, with only a fragment of the bracket showing.

A, represents a roller, and 1 is a reel at the left-hand end thereof, within which the curtain raising and lowering cord 2 is secured and reeled. The pintle 3 at the end is preferably round and turns in a correspondingly-shaped hole 4 in the arm 5 of the bracket 6, which supports the end of the roller, and the pintle 7 at the opposite end turns in an open slot 8 by means of which the roller and shade may be lifted and removed from the bracket. The bracket preferably has an overhanging arm 9 which terminates in proximity to the reel, and, in the particular form shown, a little over and beyond the vertical plane of the pintle 3. The stop-pulley 10 is rotatably mounted on a pin 11 secured at the ends in the ears of the overhanging arm 9.

This stop-pulley has three grooves therein, the main circumferential groove 12 of uniform depth at one side and the two switch-grooves 13 and 14 extending spirally therefrom and of gradually decreasing depth until they reach nothing at the cylindrical surface of the pulley, the function of which is to receive and pinch the curtain-shade raising and lowering cord 2 between the pulley and the adjacent surface of the overhanging arm of the bracket when it is desired to stop and hold the curtain-shade at the elevation desired. This is accomplished by pulling the cord slightly to the right and slackening the pulley, whereupon it is switched into one of the spiral grooves and caught between its shallow end and the arm of the bracket where it is wedged and held (the weight of the curtain co-operating to tighten and perfect the fastening) until again pulled, whereupon the cord automatically switches back into the main circumferential groove 12, where it is held while the curtain is being either raised or lowered until it is again desired to fasten it. Then the cord is pulled slightly to the right and allowed to slack, it immediately becoming pinched and caught or wedged again between the spiral groove in which it lies and the adjacent surface of the bracket-arm In this way, a simple automatic device is provided all in one attachment at the point where the curtain-shade roller is held, thus dispensing with any other fixture or fastening common in the springless curtain shades for fastening the cord.

I have described the foregoing as an illustrative type of my invention, although conscious that it is susceptible of modifications, and it is my desire to so cover the invention that it will comprehend all legitimate forms involving the principles set forth.

I claim:

1. A device of the character described including a curtain-shade, and a roller, having a round pintle, and provided with a reel at one end and a cord attached to the reel and adapted to wind thereon, and a bracket having an integral bearing formed to fit the pintle of the roller and a pair of integral ears in planes parallel with the bearing, a stop-pulley rotatably mounted in said ears to turn on an axis parallel with the axis of the curtain-shade roller, said stop-pulley having grooves therein, and between which and the bracket the cord on the reel extends, certain of said grooves being adapted to guide and clamp the cord, the curtain and cord being wound around the roller and reel in opposite directions, the cord being wound to roll up the curtain, and the curtain being unrolled by releasing and slackening the tension of the cord.

2. The combination with a curtain-shade roller and a curtain-shade and cord, said shade and cord secured to and adapted to wind thereon in opposite directions, of a bracket or fixture forming a bearing for the roller and a guide for the cord, located above the roller, and rotatable means carried by the bracket to which the cord extends directly from the roller, and between which and the bracket the cord passes and is adapted to be pinched when directed laterally to a predetermined position thereon, the cord being free and disconnected from the point where it leaves the rotatable means, so that its manipulation is at all times entirely within the control of the operator.

3. The combination with a curtain shade roller and a curtain shade and cord, said shade and cord secured to and adapted to wind thereon in opposite directions, of a bracket or fixture forming a bearing for the roller and a guide for the cord, and rotatable means carried by the bracket to which the cord extends directly from the roller, and between which and the bracket the cord passes and is adapted to be pinched when directed laterally to a predetermined position thereon, the cord being free and disconnected from the point where it leaves the rotatable means, so that its manipulation is at all times entirely within the control of the operator.

In testimony whereof I affix my signature.

CECIL A. DANIEL.